(12) United States Patent
Matsuura

(10) Patent No.: US 7,170,282 B2
(45) Date of Patent: Jan. 30, 2007

(54) ROTATION DETECTOR

(75) Inventor: Mutsumi Matsuura, Tokyo (JP)

(73) Assignee: Minebea Co., Ltd., Nagano-Ken (JP)

( * ) Notice: Subject to any disclaimer, the term of this patent is extended or adjusted under 35 U.S.C. 154(b) by 215 days.

(21) Appl. No.: 10/916,178

(22) Filed: Aug. 11, 2004

(65) Prior Publication Data

US 2005/0052180 A1   Mar. 10, 2005

(30) Foreign Application Priority Data

Sep. 5, 2003  (JP) .............................. 2003-313376

(51) Int. Cl.
  G01B 7/30  (2006.01)
  H01F 5/04  (2006.01)
(52) U.S. Cl. .............................. 324/207.25; 324/207.15
(58) Field of Classification Search ..............................
  73/862.331–862.336; 324/207.25, 207.15, 324/207.16, 207.17; 310/71, 179, 258–260; 29/596
  See application file for complete search history.

(56) References Cited

U.S. PATENT DOCUMENTS 4,728,834 A * 3/1988 Kumar et al. ............. 310/68 R
6,484,592 B2 * 11/2002 Sezaki .................... 73/862.335
2002/0098730 A1   7/2002 Babala et al.
2003/0056606 A1 * 3/2003 Matsuura et al. ....... 73/862.191
2003/0071527 A1 * 4/2003 Tetsuka et al. ............... 310/71

FOREIGN PATENT DOCUMENTS

EP  0-449-570 A  10/1991
EP  1-298-032 A  4/2003
JP  2003-098019  3/2003

* cited by examiner

Primary Examiner—Edward Lefkowitz
Assistant Examiner—Kenneth J. Whittington
(74) Attorney, Agent, or Firm—McDermott Will & Emery LLP

(57) ABSTRACT

A rotation detector designed to prevent line disconnection from being caused by an abrupt thermal change, comprising cores (10, 30) arranged inside a cylindrical housing (1), pins (15a, 15b; 35a, 35b, 35c, 35d) attached to the cores (10, 30) and connected to coils (13, 23) of the cores (10, 30), protruding from a notch (1a) of the housing (1), and a connection base (50) electrically connected to the outside via a lead wire (59) and fixed to the pins (15a, 15b; 35a, 35b, 35c, 35d).

3 Claims, 4 Drawing Sheets

ROTATION DETECTOR

This application claims priority from Japanese Application No. 2003-313376, filed Sep. 5, 2003 (incorporated by reference herein).

BACKGROUND OF THE INVENTION

1. Field of the Invention

The present invention relates to a rotation detector designed to prevent line disconnection from being caused by an abrupt thermal change.

2. Description of the Prior Arts

FIG. 1 shows a sectional side elevation view of a conventional rotation detector disclosed in Japanese Unexamined Patent Publication (Kokai) No. 2003-98019.

The conventional rotation detector is used to detect a rotation angle of a shaft. It has a rotary shaft 104a and a rotary shaft 104b arranged in series in a central portion of a cylindrical housing 101. An outer core 110 and a stator core 130 are mounted in parallel outside the rotary shaft 104a but inside the housing 101 while an inner core 120 is mounted on the rotary shaft 104a oppositely to the outer core 110. A rotor core 140 is mounted on the rotary shaft 104a oppositely to the stator core 130.

In the outer core 110, a core 112 is provided surrounding a side face of a bobbin 111 including a coil 113 formed by winding a wire into a form of a winding, the ends of which coil 113 are connected to outer core pins 115a and 115b placed side by side on a connection base 150 in the horizontal direction respectively. The inner core 120 includes a coil 123 formed by winding a wire into a form of a winding.

In the stator core 130, coils 133 are formed by winding wires into a form of a winding on a plurality of annular stator core teeth 131 arranged on an annular base plate 132. Four ends of the coils 133, which are connected to each other in X direction (the horizontal direction) and in Y direction (the vertical direction), are connected through the annular base plate 132 to stator core pins 135a, 135b, 135c and 135d which are placed side by side in the horizontal direction on the annular base plate 132. In the rotor core 140, a coil 143 is formed by winding a wire into a form of a winding on a plurality of annular rotor core teeth 141 arranged on the rotary shaft 104a.

The connection base 150 is fixed with a fixing bolt 102 outside of the housing 101. The outer core pins 115a and 115b and the stator core pins 135a, 135b, 135c and 135d are attached to the connection base 150, which is surrounded by a cover 103.

The conventional rotation detector has the same configuration for detecting a rotation angle of the rotary shaft 104b as that for the rotary shaft 104a and therefore is capable of detecting a rotation angle for the rotary shaft 104a and the rotary shaft 104b, respectively.

The conventional rotation detector, however, has the following problem.

FIG. 2 illustrates in an enlarged scale a fixing state of the connection base 150 in the conventional rotation detector shown in FIG. 1.

As shown in FIG. 2, the outer core pins 115a and 115b are attached to a bobbin terminal 114 provided in the bobbin 111, and the stator core pins 135a, 135b, 135c and 135d are attached to the annular base plate 132 via a stator core terminal 134. The connection base 150 is, as shown in FIG. 1, fixed to the housing 101 with the fixing bolt 102. The outer core pins 115a and 115b and the stator core pins 135a, 135b, 135c and 135d are inserted into through-holes 152 with conductive coatings 151 formed on the through-holes 152 bored in the connection base 150, respectively, and fixed to the conductive coatings 151 with solder 153.

When there is an abrupt thermal change applied to the conventional rotation detector, any forces as indicated by arrows A and B will be exerted on a portion between the connection base 150 and the outer core pins 115a and 115b or the stator core pins 135a, 135b, 135c and 135d due to a difference in a coefficient of thermal expansion between the housing 101 formed of metal and the bobbin 111 formed mainly of resin material to which the outer core pins 115a and 115b are attached or the annular base plate 132 formed of, for example, glass epoxy resin material to which the stator core pins 135a, 135b, 135c and 135d are attached. For example, for the housing 101 with a diameter of 50 mm, the additional forces may cause a relative shift of 0.1 to 0.2 mm between the connection base 150 and any of those pins. Therefore, there is a possibility of an occurrence of a crack or a breakage on the solder 153 fixing the connection base 150 to the outer core pins 115a and 115b or to the stator core pins 135a, 135b, 135c and 135d, thereby causing line disconnection in the connection base 150.

SUMMARY OF THE INVENTION

The present invention has been made in view of the above problem and therefore it is an object of the present invention to provide a rotation detector designed to prevent line disconnection from being caused by an abrupt thermal change.

According to the present invention, there is provided a rotation detector, comprising cores provided inside a cylindrical housing; pins attached to the cores and connected to coils of the cores, protruding from a notch of the housing; and a connection base electrically connected to the outside via a lead wire and fixed to the pins.

The pins pass through a base holder having a circular-arc section provided on an outer periphery of the housing to fix the connection base.

The number of the pins or a diameter of the pins is increased to a predetermined value.

Furthermore, the pins are attached to a bobbin terminal extending to a side face of the bobbin and fixed to the bobbin or the pins are attached to the stator core terminal extending to an inner diameter position of an annular base plate and fixed thereto.

The rotation detector of the present invention comprises the cores provided inside the cylindrical housing; pins attached to the cores and connected to the coils of the cores, protruding from the notch of the housing; and the connection base electrically connected to the outside via the lead wire and fixed to the pins. Therefore, the connection base can be attached in a floating structure, thereby preventing line disconnection from being caused by an abrupt thermal change.

The pins pass through the base holder having the circular-arc section provided on the outer periphery of the housing to fix the connection base, thereby increasing transverse stiffness in pin attachment and enabling the connection base to be firmly fixed in the floating structure.

The number of pins may be increased as desired or a diameter of the pins may be increased to a predetermined value, thereby enabling the connection base to be firmly fixed in the floating structure.

Furthermore, the pins are attached to the bobbin terminal extending to the side face of the bobbin and fixed to the bobbin or the pins are attached to the stator core terminal extending to the inner diameter position of the annular base plate and fixed thereto, thereby increasing stiffness in pin attachment and enabling the connection base to be firmly fixed in the floating structure.

DETAILED DESCRIPTION OF THE PREFERRED EMBODIMENTS

The present invention will now be described in detail hereinafter with reference to the accompanying drawings.

Figure 1:
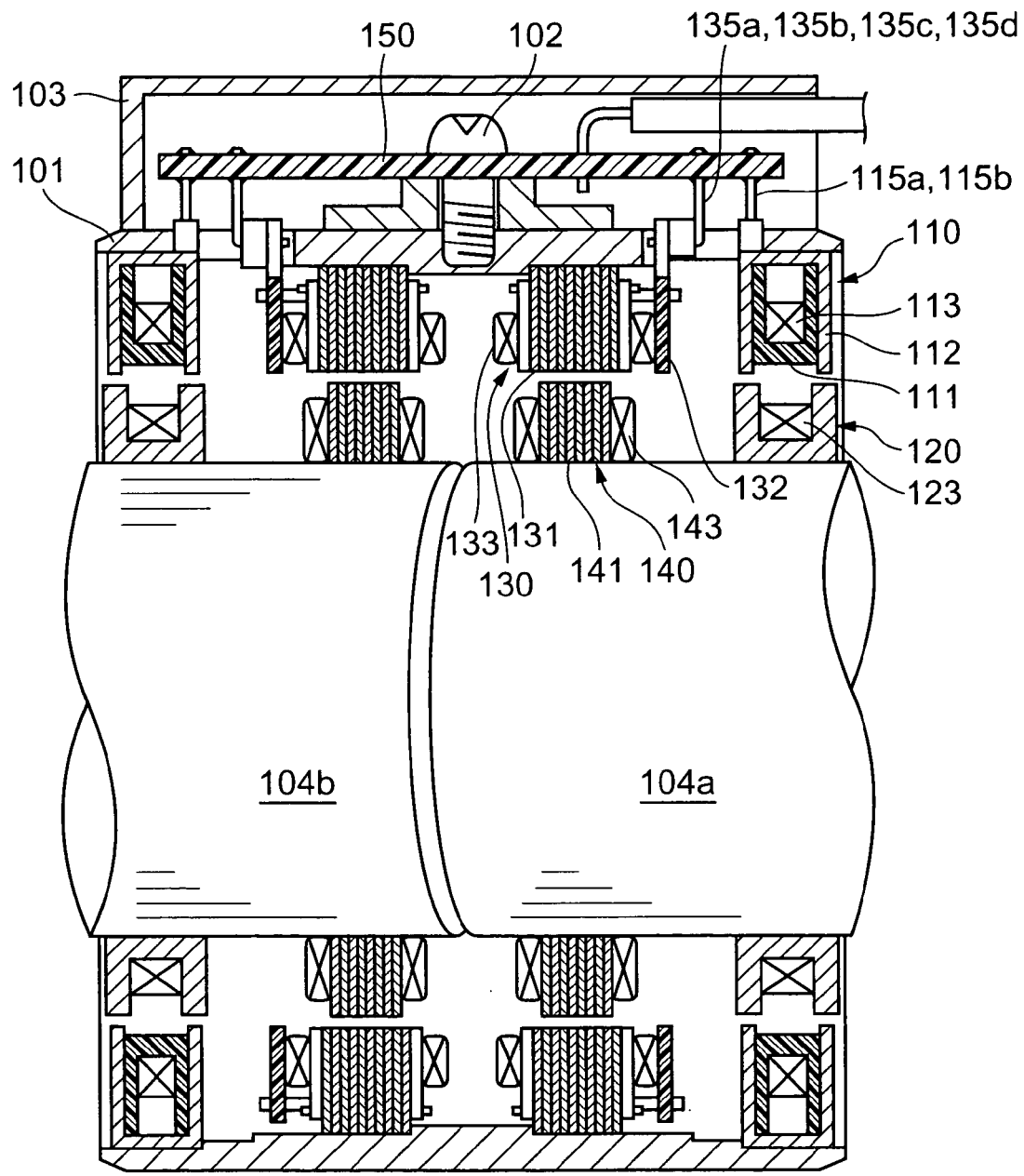
FIG. 1 is a sectional side elevation view of a conventional rotation detector.
Figure 2:
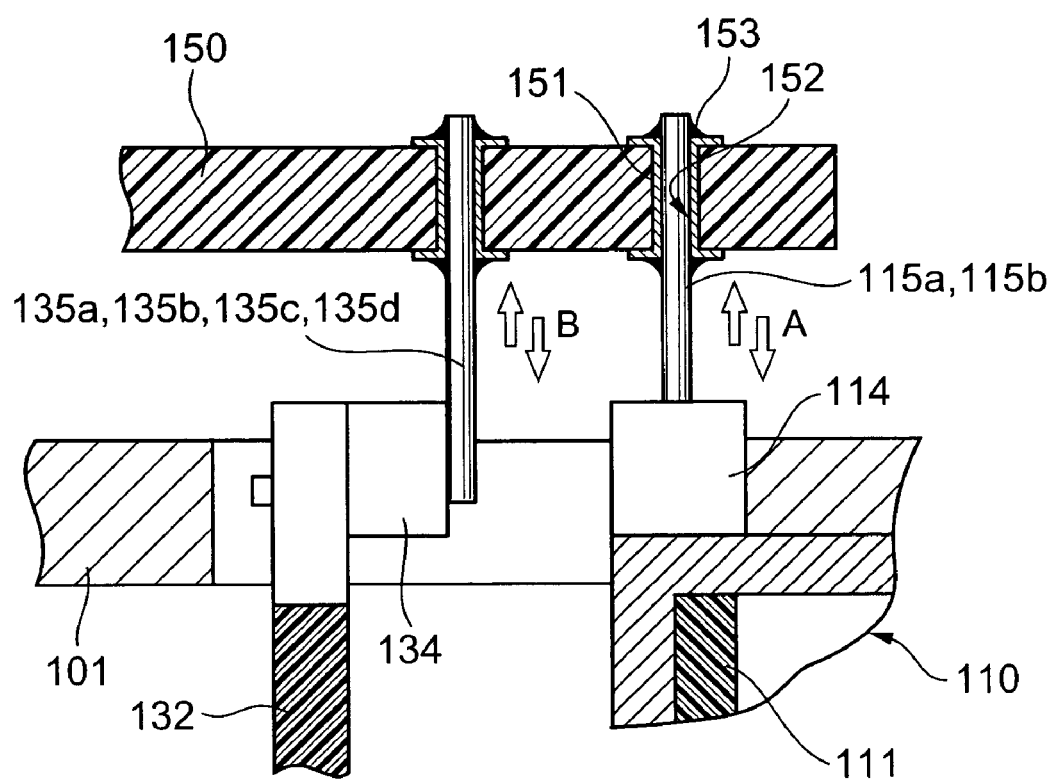
FIG. 2 shows in an enlarged scale a fixing state of a connection base in the conventional rotation detector.
Figure 3:
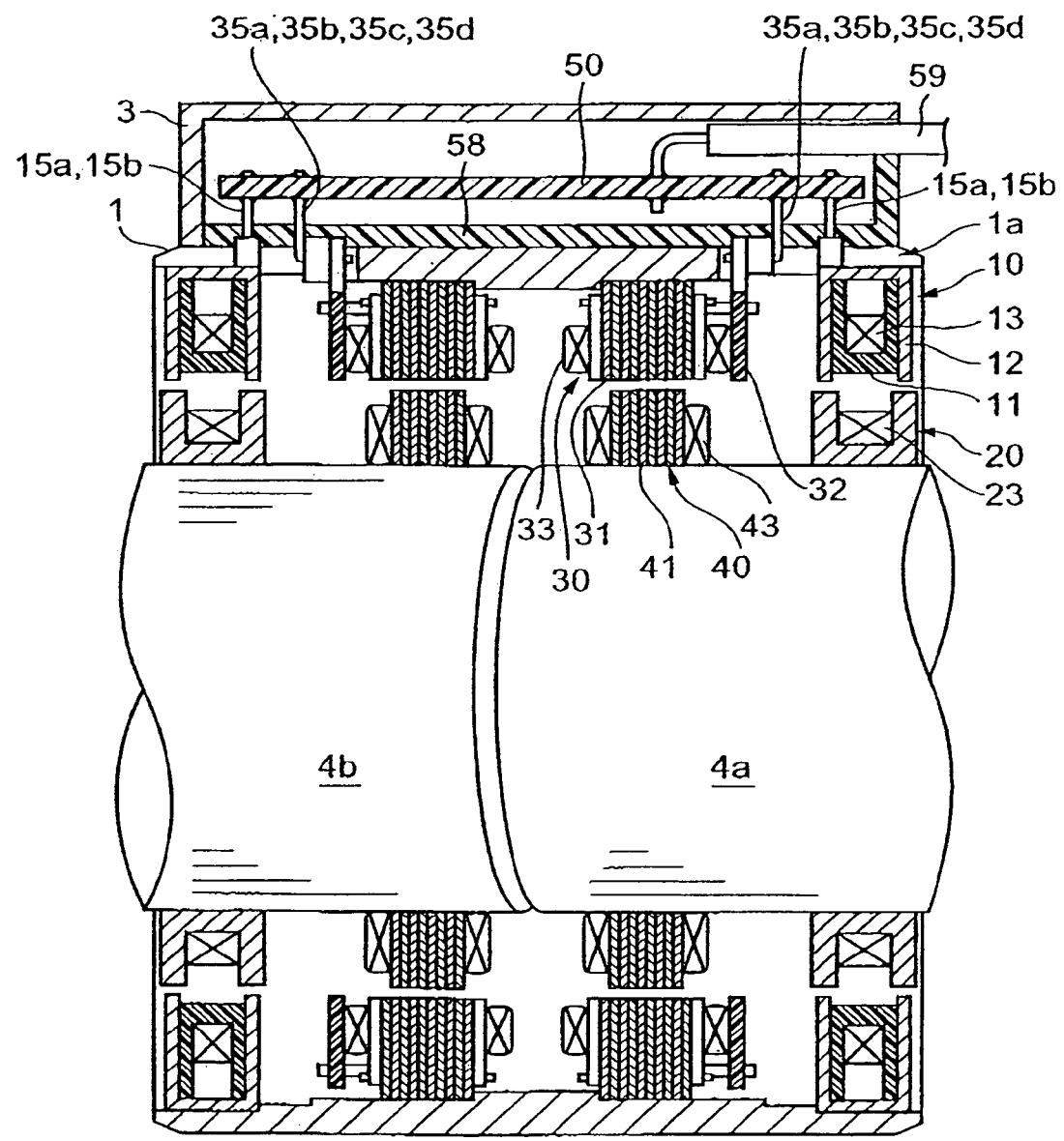
FIG. 3 is a sectional side elevation view of a rotation detector according to an embodiment of the present invention.

Referring to FIG. 3, there is shown a sectional side elevation view of a rotation detector according to an embodiment of the present invention.

As shown in FIG. 3, the rotation detector according to the embodiment of the present invention has a rotary shaft 4a and a rotary shaft 4b arranged in series in a central portion of a cylindrical housing 1 and has an outer core 10 and a stator core 30 mounted in parallel outside the right-hand rotary shaft 4a, but inside the housing 1 with an inner core 20 mounted on the rotary shaft 4a oppositely to the outer core 10 and a rotor core 40 mounted on the rotary shaft 4a in an inner position opposite to the stator core 30.

In the outer core 10, a core 12 is provided surrounding a side face of a bobbin 11 in which a coil 13 is formed by winding a wire into a form of a winding, the ends of which coil 13 are connected to outer core pins 15a and 15b attached to the bobbin 11, respectively. In the inner core 20, a coil 23 is formed by winding a wire into a form of a winding.

In the stator core 30, coils 33 are formed by winding wires into a form of a winding on a plurality of annular stator core teeth 31 arranged on an annular base plate 32. Four ends of the coils 33 connected to each other in X direction (the horizontal direction) and in Y direction (the vertical direction) are connected through the annular base plate 32 to stator core pins 35a, 35b, 35c and 35d attached to the annular base plate 32. In the rotor core 40, a coil 43 is formed by winding a wire into a form of a winding on a plurality of rotor core teeth 41 arranged on the rotary shaft 4a.

The rotation detector according to this embodiment of the present invention has the same configuration for rotation detection for the left-hand rotary shaft 4b as that for the right-hand rotary shaft 4a as above explained.

A connection base 50 is fixed outside the housing 1 to the outer core pins 15a and 15b and to the stator core pins 35a, 35b, 35c and 35d, which are protruding from a notch 1a of the housing 1. The connection base 50 is surrounded by a cover 3.

When an AC voltage is applied to the outer core 10, the voltage is supplied to the rotor core 40 via the inner core 20 and the stator core 30 is magnetically coupled to the rotor core 40. Thereby, upon a rotation of the rotary shaft 4a, the stator core 30 induces voltages having phases different from each other according to the rotation angle. The voltages are output to the outside via a lead wire 59 and the rotation angle of the rotary shaft 4a is detected. A rotation angle of the left-hand rotary shaft 4b can also be detected in the same manner. Therefore, a rotation angle between the rotary shaft 4a and the rotary shaft 4b can be detected, too.

Figure 4:
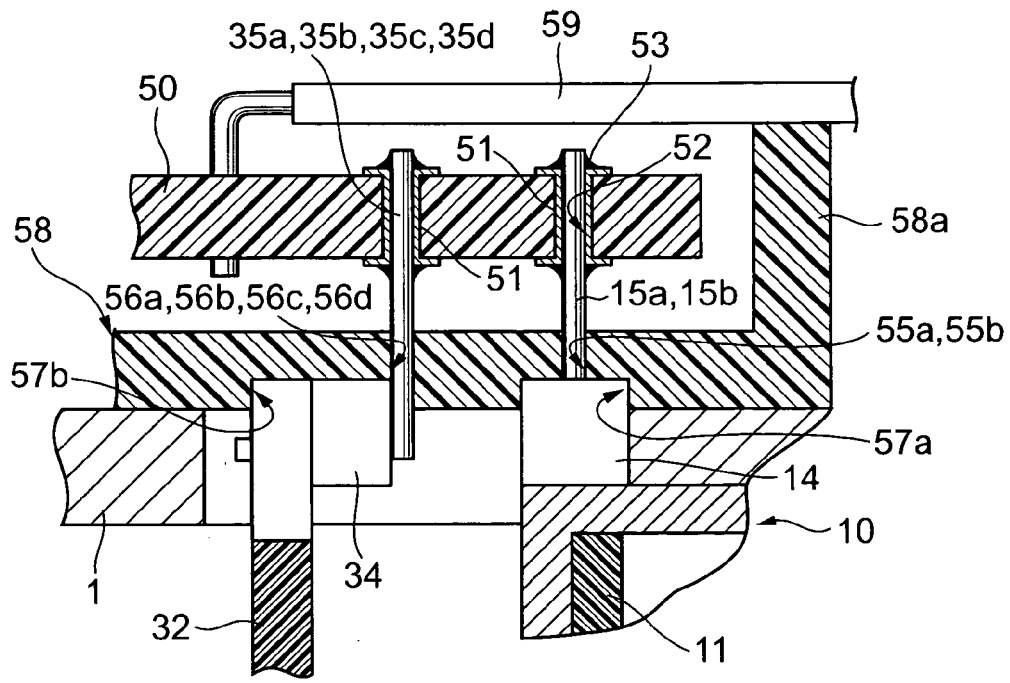
FIG. 4 shows a fixing state of a connection base in the rotation detector according to a first embodiment of the present invention.

FIG. 4 shows a fixing state of the first embodiment of the connection base 50 in the rotation detector according to the present invention.

As shown in FIG. 4, the rotation detector according to this embodiment of the present invention has the outer core pins 15a and 15b attached to the bobbin 11 via the bobbin terminal 14 fixed to the outer core 10 and the stator core pins 35a, 35b, 35c and 35d provided at the stator core terminal 34 attached to the annular base plate 32. The connection base 50 is not fixed to the housing 1, but fixed to the outer core pins 15a and 15b and to the stator core pins 35a, 35b, 35c, and 35d (while the connection base 50 is also fixed to outer core pins 15a and 15b and to stator core pins 35a, 35b, 35c, and 35d on the left-hand side, they are not shown here).

A base holder 58 is attached to the housing 1. The base holder 58 has holes 55a and 55b for the outer core pins 15a and 15b passing through them, holes 56a, 56b, 56c and 56d for the stator core pins 35a, 35b, 35c and 35d passing through them, a recess 57a for the bobbin terminal 14 fit into it, and a recess 57b for the stator core terminal 34 fit into it. This increases transverse stiffness between the outer core pins 15a and 15b and the stator core pins 35a, 35b, 35c and 35d when they are attached, by which the connection base 50 is firmly fixed. Furthermore, the base holder 58 has an upwardly bent portion 58a to which a lead wire 59 can be fixed.

The outer core pins 15a and 15b and the stator core pins 35a, 35b, 35c and 35d are inserted into through holes 52 with conductive coatings 51 formed inside thereof, which holes are bored in the connection base 50, and are fixed to the conductive coatings 51 with solder 53. Therefore, the outer core pins 15a and 15b and the stator core pins 35a, 35b, 35c and 35d are connected to the lead wire 59 via a pattern circuit (not shown) formed on the connection base 50.

In the rotation detector according to the first embodiment, a coefficient of thermal expansion is different between the housing 1 made of a metal and the bobbin 11 made mainly of resin material to which the outer core pins 15a and 15b are attached or the annular base plate 32 made of, for example, glass epoxy resin material to which the stator core pins 35a, 35b, 35c and 35d are attached. When there is an abrupt thermal change applied to the conventional rotation detector, however, any additional force is not exerted on a portion between the connection base 50 and the outer core pins 15a and 15b or the stator core pins 35a, 35b, 35c and 35d, because a floating mechanism is provided in which the connection base 50 is fixed to the outer core pins 15a and 15b and to the stator core pins 35a, 35b, 35c and 35d, but not fixed to the housing 1. Thereby, it is prevented that a crack or a breakage may occur on the solder 53 and line disconnection on the connection base 50 can be avoided.

Figure 5:
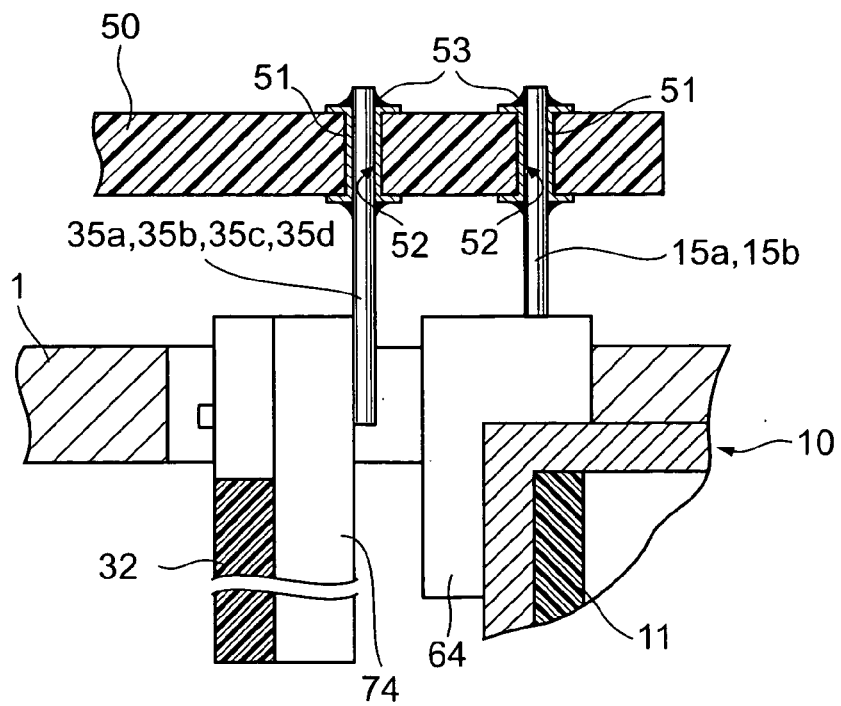
FIG. 5 shows a fixing state of a connection base in the rotation detector according to a second embodiment of the present invention.

FIG. 5 shows another fixing state of the connection base 50 in the rotation detector according to the present invention. Like reference numerals indicate like components in FIG. 4.

As shown in FIG. 5, the connection base 50 is not fixed to a housing 1, but fixed to outer core pins 15a and 15b and to stator core pins 35a, 35b, 35c and 35d in the same manner as for the first embodiment. The connection base 50 is also fixed to the outer core pins 15*a* and 15*b* and to stator core pins 35*a*, 35*b*, 35*c* and 35*d* in the left-hand side, although not shown here.

The outer core pins 15*a* and 15*b* are attached to a bobbin terminal 64 fixed to an outer core 10 and the stator core pins 35*a*, 35*b*, 35*c* and 35*d* are attached to a stator core terminal 74 extending to an inner diameter position of the annular base plate 32. Therefore, it is possible to increase stiffness in attaching the outer core pins 15*a* and 15*b* and the stator core pins 35*a*, 35*b*, 35*c* and 35*d* whereby the connection base 50 is firmly fixed.

Also in the second embodiment, a floating mechanism is provided in which the connection base 50 is fixed to the outer core pins 15*a* and 15*b* and to the stator core pins 35*a*, 35*b*, 35*c* and 35*d* but not fixed to the housing 1, thereby achieving increased stiffness of attachment. Therefore, an abrupt thermal change, if applied, does not cause any additional force to be exerted on the portion between the connection base 50 and the outer core pins 15*a* and 15*b* or the stator core pins 35*a*, 35*b*, 35*c* and 35*d*. Thereby, it is prevented that a crack or a breakage may occur on the solder 53 and therefore line disconnection on the connection base 50 can be avoided. It should be noted that the number of the outer core pins 15*a* and 15*b* and the stator core pins 35*a*, 35*b*, 35*c* and 35*d* can be increased or the diameters of the pins can be increased so as to increase the strength in fixing the connection base 50.

While the rotation detector for detecting a rotation angle between the rotary shaft 4*a* and the rotary shaft 4*b* has been described in the embodiments of the present invention, it is to be understood that the present invention is not limited thereto, but can be put into practice in the same manner according to a rotation detector for detecting a torque of a single rotary shaft by means of two rotation angle detecting mechanisms.

Furthermore, the present invention can be put into practice according to a rotation detector for detecting a rotation angle of a rotary shaft by means of a single rotation angle detecting mechanism.

Accordingly, in the rotation detector according to the present invention, the connection base 50 is not fixed to the housing 1, but fixed to the outer core pins 15*a* and 15*b* and to the stator core pins 35*a*, 35*b*, 35*c* and 35*d* to achieve the floating structure, thereby preventing line disconnection from being caused by an abrupt thermal change.

What is claimed is:

1. A rotation detector comprising:
   outer cores and stator cores provided inside a cylindrical housing;
   pins attached to the cores and connected to coils of the cores, the pins extending through a notch of the housing; and
   a floating mechanism comprising a connection base electrically connected to an outside of the rotation detector via a lead wire and fixed to the pins, wherein the connection base is connected to the housing only through the pins.

2. The rotation detector according to claim 1, wherein the pins pass through a base holder having a circular-arc section provided on an outer periphery of the housing to fix the connection base.

3. The rotation detector according to claim 1, wherein the pins are attached to a bobbin via a bobbin terminal being attached to a side face of the bobbin or the pins are attached to a stator core terminal extending to an inner diameter position of an annular base plate and fixed thereto.

* * * * *